J. ROTHCHILD.
FLUSH VALVE.
APPLICATION FILED JUNE 13, 1908.

965,946.

Patented Aug. 2, 1910.
3 SHEETS—SHEET 2.

Attest:
May Hughes
Alan C. McDonnell

Joseph Rothchild, Inventor:
by William R. Baird
his Atty.

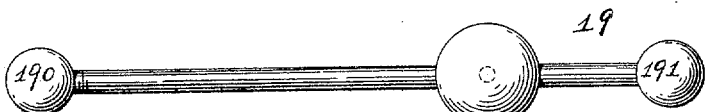
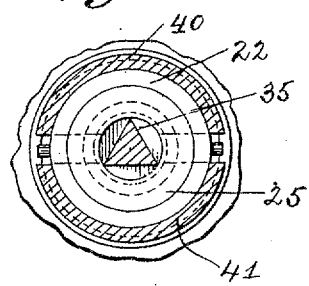
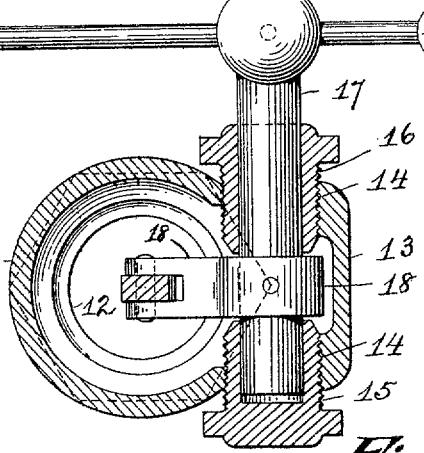
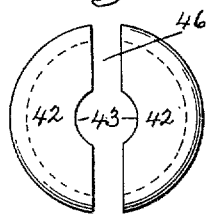
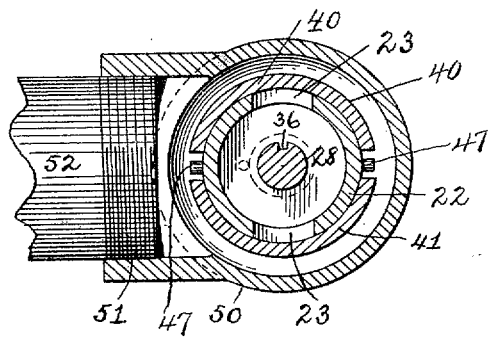

UNITED STATES PATENT OFFICE.

JOSEPH ROTHCHILD, OF BAYONNE, NEW JERSEY, ASSIGNOR TO JOHN SIMMONS COMPANY, OF NEW YORK, N. Y., A CORPORATION OF NEW YORK.

FLUSH-VALVE.

965,946. Specification of Letters Patent. Patented Aug. 2, 1910.

Application filed June 13, 1908. Serial No. 438,266.

*To all whom it may concern:*

Be it known that I, JOSEPH ROTHCHILD, a citizen of the United States, and resident of Bayonne, Hudson county, New Jersey, have invented certain new and useful Improvements in Flush-Valves, of which the following is a specification.

My invention relates to flush valves for water closets, and the like, and its novelty consists in the construction and adaptation of the parts as will be more fully hereinafter pointed out.

The object of the invention is to secure a quick full opening of the valve practically without friction and to secure a slow closing movement which is assisted by the pressure of the water itself upon the valve.

Figure 1:
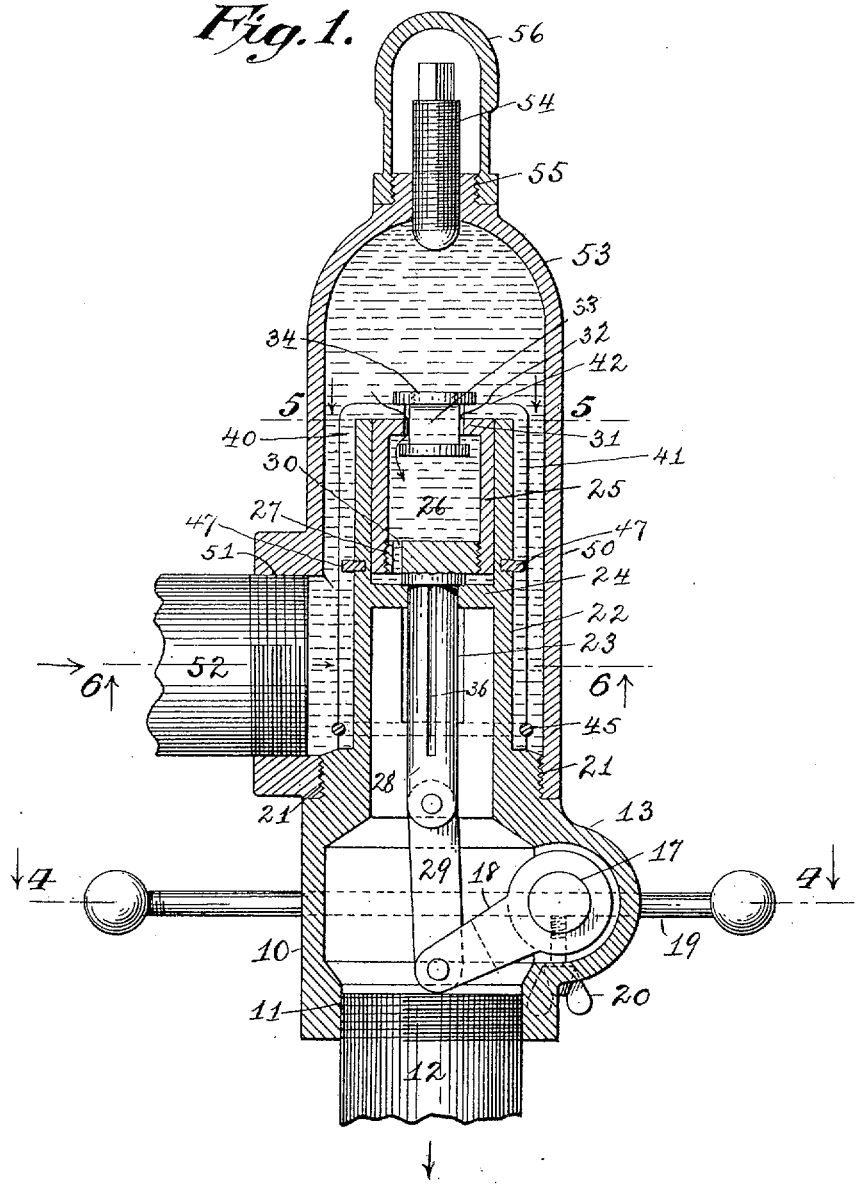
Figure 2:
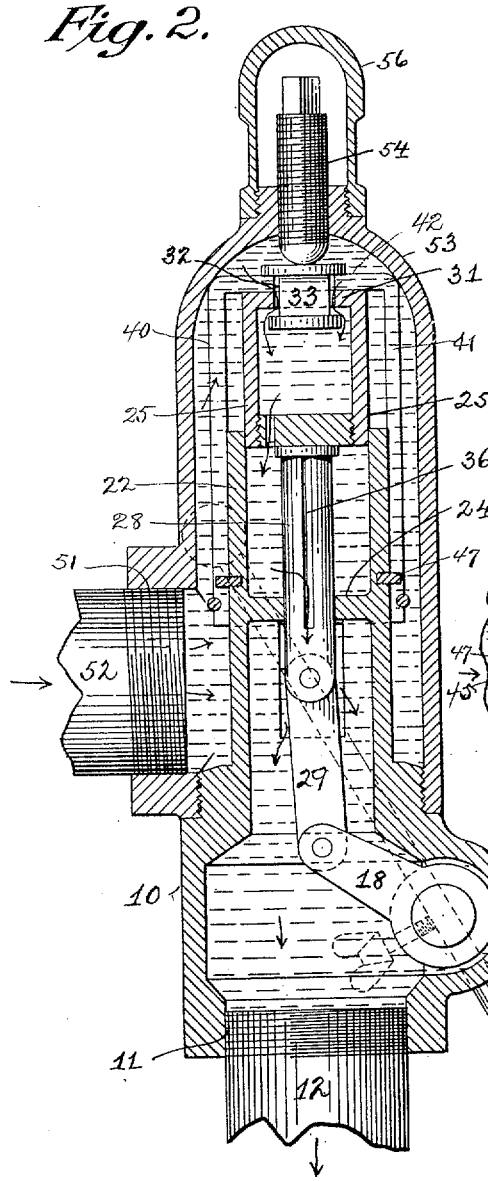
Figure 3:
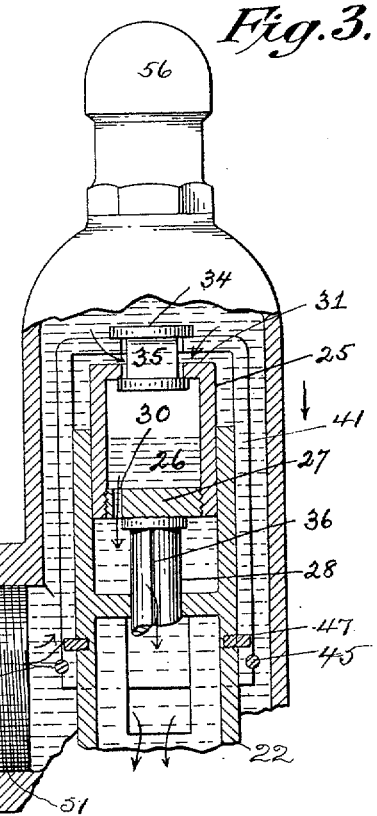
Figure 9:
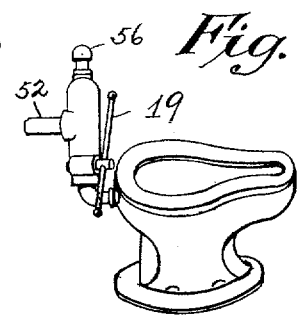

In the drawings, Figure 1 is a central vertical section through a form of valve embodying my invention, the valve being shown in a closed position; Fig. 2 is a view similar to Fig. 1 with the valve wide open, and Fig. 3 is a view similar to Figs. 1 and 2 showing the position of the valve piston about midway of the return stroke; Fig. 4 is a transverse horizontal section on the plane of the line 4—4 in Fig. 1, the vise-handle lever being shown in plan; Fig. 5 is a transverse horizontal section on the plane of the line 5—5 in Fig. 1; Fig. 6 is a transverse horizontal section on the plane of the line 6—6 in Fig. 1; Fig. 7 is a top plan view of the sliding gates and Fig. 8 is a side elevation thereof, the same being shown in Figs. 7 and 8 detached from the other parts of the device; Fig. 9 is a miniature view showing the relation of the valve to a closet.

In the drawings, 10 is the lower member of the valve casing provided internally with a threaded surface 11 at its lower extremity to receive the upper threaded end of the discharge conduit 12. It is provided with an outwardly extending bracket 13 having a transverse threaded bore 14 to receive two threaded bearings 15 and 16 which are adapted to support a short shaft 17 to which is keyed, or otherwise secured, a crank 18 and the outer end of which is provided with a slidable vise-handle lever 19 provided, if desired, with a set screw 20, and with weights 190 and 191.

The member 10 is hollow internally and is restricted and threaded externally at 21 to receive the lower inner threaded end of the upper member 50 of the casing. It is further restricted to form a cylinder 22 provided with oppositely disposed ports 23, and which cylinder is open at its top and is provided with an intermediate transverse apertured partition 24.

Arranged within the upper part of the cylinder 22, and above the partition 24, is a piston 25 adapted to be reciprocated within the cylinder. This piston is made of peculiar form. It has a hollow interior 26. Its lower end is partly closed by a plate 27 to which is secured the piston rod 28 which in turn is connected to the crank 18 by the link 29. A leaking aperture 30 is formed in the plate 27. The upper end of the piston 25 is partly closed by a plate 31 having an aperture 32 in which there is adapted vertically to reciprocate a puppet valve 33, the disks 34 of which overlap the aperture 32 and the stem 35 of which is of such a form as only partly to fill the aperture 32. The piston rod 28 is provided with a longitudinal groove 36 of lesser cross sectional area than that of the leaking aperture 30 in the plate 27.

Snugly fitting the outer surface of the cylinder 22 are two gates 40 and 41 each practically of semi-cylindrical form and each provided with an upper inturned flange 42 which rests upon the upper plate 31 of the piston 25, and which is recessed at 43. Near its lower end each gate is provided with a groove 44 to receive an elastic retaining ring 45 of metal or similar suitable material. It will be noted (see Fig. 6) that the gates only partly embrace the cylinder 22 and that a space 46 is left between them at each side and at the top when the parts are assembled.

47 are guide pins secured to the cylinder 22 and which prevent the gates 40 and 41 from slipping circularly and being brought into contact with each other.

The upper member 50 of the valve casing is provided with a suitably threaded lateral aperture 51 adapted to receive the threaded end of the inlet conduit 52. The member 50 extends above the top of the cylinder 22 and is finally restricted to form a dome 53 provided with a threaded aperture adapted to receive a threaded stop pin 54 and with a threaded flange 55 adapted to receive a protecting cap 56.

The inlet ports 23 of the cylinder 22 are arranged one-quarter way around the cylinder from the opening leading to the inlet conduit 52. The groove 36 in the piston rod 28 is placed directly opposite one of the ports 23 in order that the impact of the incoming water against this groove may keep it free from dirt and unobstructed.

In the operation of the device, the parts are normally in the position shown in Fig. 1. It will be noted that the water coming through the inlet conduit 52 has filled the interior space between the upper member of the casing and the cylinder 22, but that it is excluded from access to the interior of the cylinder, except such water as may leak through the space between the puppet valve stem 35 and the plate 31 and thence through the aperture 30 into the space beneath the piston 25. When the lever 19 is tilted (as shown in Fig. 2), the piston rod 28 is lifted. This in turn lifts the piston 25 and through the flanges 42 of the gates 40 and 41 lifts them to uncover the ports 23 in the cylinder 22. The fluid rushes in through those ports to the interior of the cylinder 22 and thence downward and onward into the outlet conduit 12. The upper movement of the piston is limited by the upper disk 34 of the puppet valve 33 being brought into contact with the lower surface of the stop pin 54. The lever 19 being then released, its weight tends to rotate the shaft 17 and the crank 18 and through the connecting rod 29 to pull downward upon the piston rod 28. This brings the parts into the position shown in Fig. 3 when the lower disk 34 of the puppet valve 33 seats against the inner surface of the plate 31 of the piston 25 and prevents the further entry of the water through the space surrounding the puppet valve stem. The water which is underneath the piston and above the partition 24 leaks out through the longitudinal groove 36 in the piston rod 28.

One advantage of using the vise-handle lever is illustrated in Fig. 10 where it can be seen that either a right or left handed person may use the device equally well. Also by sliding the lever 19 in the bearings provided for that purpose on the end of the shaft 17 any relative adjustment of the weight of the lever to the pressure of the water supplied is readily secured and it can be so arranged that the valve will be opened by almost any desired pressure.

When the sliding gates are down to close the ports the pressure of the incoming fluid against them tends to keep them closed. This pressure is communicated through the opening around the puppet valve stem into the interior of the hollow piston and into the space immediately beneath the lower plate of the piston. That is, the pressure against the gates and the pressure within the piston is substantially the same. When the lever 19 is actuated and the piston is moved upward this pressure within the piston continues to be the same as the pressure of the incoming column of fluid, but when the piston is no longer moved but begins to descend the pressure of the incoming fluid against the interior of the piston is cut off because of the seating of the lower disk of the puppet valve against the inside of the piston head. Then the external pressure upon the piston being the same as the pressure of the incoming fluid against the sliding gates the friction between the gates and the cylinder which they partly embrace is counteracted and the piston easily, but slowly, descends.

The difference in cross sectional area between the opening surrounding the valve stem of the puppet valve and the leaking aperture 30 retards such descent, the friction on each side of the sliding gates substantially counteracting the pressure and vice versa. It will be noticed that this difference of pressure is the same no matter what may be the pressure of the incoming fluid.

What I claim as new is:—

1. A flush valve comprising an outer casing impervious to water and provided with an inlet conduit, an inner casing having inlet ports and gates adapted normally to close said ports consisting of a plurality of shells adapted loosely to embrace the inner casing.

2. A flush valve comprising an outer casing impervious to water and provided with an inlet conduit, an inner casing having inlet ports and gates adapted normally to close said ports, consisting of a plurality of shells adapted loosely to embrace the inner casing and partly to encircle it.

3. A flush valve comprising an outer casing impervious to water and provided with an inlet conduit, an inner casing having inlet ports and gates adapted normally to close said ports consisting of a plurality of shells adapted loosely to embrace the inner casing, in combination with means for yieldingly holding the same against it.

4. A flush valve comprising an outer casing impervious to water and provided with an inlet conduit, an inner casing having inlet ports and gates adapted normally to close said ports consisting of a plurality of shells adapted loosely to embrace the inner casing, in combination with means for yieldingly holding the same against it consisting of an encircling device.

5. A flush valve comprising an outer casing impervious to water and provided with an inlet conduit, an inner casing having inlet ports and gates adapted normally to close said ports consisting of a plurality of shells adapted loosely to embrace the inner casing, in combination with means for preventing the circumferential displacement of the shells with respect to the casing.

6. A flush valve comprising an outer casing impervious to water and provided with an inlet conduit, an inner casing having inlet ports and gates adapted normally to close said ports consisting of a plurality of shells adapted loosely to embrace the inner casing, in combination with means for preventing the circumferential displacement of the shells with respect to the casing, consisting of positioning pins carried by the casing.

7. A flush valve comprising an outer casing impervious to water and provided with an inlet conduit, an inner casing having inlet ports and gates adapted normally to close said ports consisting of a plurality of shells adapted loosely to embrace the inner casing and provided with overlapping flanges.

8. A flush valve comprising an outer casing impervious to water and provided with an inlet conduit, an inner casing having inlet ports and gates adapted normally to close said ports consisting of a plurality of shells adapted loosely to embrace the inner casing and provided with overlapping flanges having recesses therein.

9. A flush valve, comprising an outer casing, an inlet conduit entering the side thereof, an inner casing provided with ports communicating with the space between the casings, an outlet conduit leading from the bottom of the inner casing, gates inclosing the inner casing and adapted normally to close said ports and means for moving the gates to open the ports, consisting of a hollow piston provided with a water inlet and a water outlet of less cross sectional area than the inlet.

10. A flush valve, comprising an outer casing, an inlet conduit entering the side thereof, an inner casing having ports leading to the space between the casings, an outlet conduit leading from the bottom of the inner casing, gates adapted normally to close said ports and means for moving the gates to open the ports, consisting of a hollow piston provided with a valve controlled water inlet and a free outlet of less cross sectional area than the inlet.

11. A flush valve, comprising an outer casing, an inlet conduit entering the side thereof, an inner casing having ports leading to the space between the casings, an outlet conduit leading from the bottom of the inner casing, gates adapted normally to close said ports and means for moving the gates to open the ports, consisting of a hollow piston provided with a water inlet, a water outlet of less cross sectional area than the inlet, and a puppet valve adapted to control the inlet.

12. A flush valve, comprising an outer casing, an inlet conduit entering the side thereof, an inner casing, an outlet conduit leading from the bottom thereof, ports in the inner casing leading to the space between the casings, gates adapted normally to close said ports and means for moving the gates to open the ports, consisting of a hollow piston provided with an upper plate provided with an inlet, an automatically operating valve controlling the same and adapted to admit water at the forward stroke of the piston and shut it off at its rearward stroke and a water outlet of less cross-sectional area.

13. In a device of the kind described, an outer casing, an inner casing provided with ports leading from its interior to the space between the casings, gates adapted normally to close said ports, and means for moving the gates, consisting of a hollow piston, means for admitting the fluid into the hollow-piston at the forward stroke of said piston comprising a puppet valve, and means for discharging the fluid from the piston, at a lesser rate comprising a leaking aperture through the end of the piston opposite the puppet valve, of less cross sectional area than the water inlet.

14. In a device of the kind described, an outer casing an inner casing provided with ports leading from the interior thereof to the space between the casings, gates adapted to close said ports, and means for moving the gates consisting of a hollow piston, a diaphragm in the inner casing, a rod connected to the piston and passing through the diaphragm, a leaking groove in the rod, means for moving the rod, means for admitting the fluid into the hollow piston at the forward stroke thereof, comprising a puppet valve, and means for discharging the fluid from the hollow piston at a lesser rate comprising a leaking aperture in the piston opposite the puppet valve of less cross sectional area than the water inlet.

15. In a device of the kind described, an outer casing communicating with an inlet conduit, and an inner casing divided into two parts, viz: a lower part provided with inlet ports and communicating with an outlet conduit and an upper part forming a piston cylinder, the two parts being separated by a diaphragm impervious to water, in combination with a piston adapted to reciprocate within the upper part of the inner casing and provided with a valve for admitting the water to the interior of the piston and an aperture for discharging it into the space between the piston and the diaphragm.

16. In a device of the kind described, an outer casing communicating with an inlet conduit, and an inner casing divided into two parts, viz: a lower part provided with inlet ports and communicating with an outlet conduit and an upper part forming a piston cylinder, the two parts being separated by a diaphragm impervious to water, in combination with a piston adapted to reciprocate within the upper part of the inner casing and having a valve for admitting the water to the interior of the piston and an aperture for discharging it into the space between the piston and the diaphragm, the latter aperture being the smaller.

17. In a device of the kind described, an outer casing communicating with an inlet conduit, and an inner casing divided into two parts, viz: a lower part provided with inlet ports and communicating with an outlet conduit and an upper part forming a piston cylinder, the two parts being separated by a diaphragm impervious to water, in combination with a piston adapted to reciprocate within the upper part of the inner casing and having an actuating piston rod, the piston having a valve for admitting the water to the interior of the piston and an aperture for discharging it into the space between the piston and the diaphragm and the rod having a leaking groove leading across the diaphragm.

18. In a device of the kind described, an outer casing communicating with an inlet conduit, and an inner casing divided into two parts, viz: a lower part provided with inlet ports and communicating with an outlet conduit and an upper part forming a piston cylinder, the two parts being separated by a diaphragm impervious to water, in combination with gates slidably mounted to embrace the inner casing to close the ports.

19. In a device of the kind described, an outer casing communicating with an inlet conduit, and an inner casing divided into two parts, viz: a lower part provided with inlet ports and communicating with an outlet conduit and an upper part forming a piston cylinder, the two parts being separated by a diaphragm impervious to water, in combination with gates slidably mounted to embrace the inner casing to close the ports and means for moving the gates.

20. In a device of the kind described, an outer casing communicating with an inlet conduit, and an inner casing divided into two parts, viz: a lower part provided with inlet ports and communicating with an outlet conduit and an upper part forming a piston cylinder, the two parts being separated by a diaphragm impervious to water, in combination with gates slidably mounted to embrace the inner casing to close the ports and a piston adapted to reciprocate within the casing and coöperating with the gates to move them to cover and uncover the ports.

21. In a device of the kind described, an outer casing communicating with an inlet conduit, and an inner casing divided into two parts, viz: a lower part provided with inlet ports and communicating with an outlet conduit and an upper part forming a piston cylinder, the two parts being separated by a diaphragm impervious to water, in combination with gates slidably mounted to embrace the inner casing to close the ports and provided with flanges adapted to overlap the upper part of the casing, and a piston adapted to reciprocate within the casing and to move against the gates to cover and uncover the ports.

Witness my hand this 12th day of June 1908.

JOSEPH ROTHCHILD.

Witnesses:
MAY HUGHES,
ALAN C. MCDONNELL.